Spangler, Madlem, & Spangler,
Manure Fork.
No. 86,951.   Patented Feb. 16, 1869.
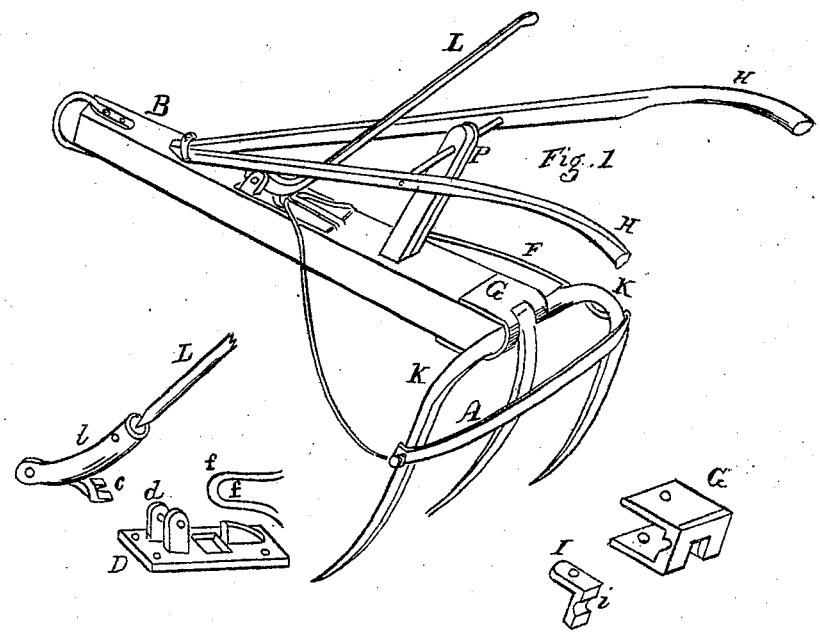

United States Patent Office.

JACOB S. SPANGLER, DANIEL MADLEM, AND HARRISON D. SPANGLER, OF EPHRATA, PENNSYLVANIA.

Letters Patent No. 86,951, dated February 16, 1869.

IMPROVEMENT IN MANURE-DRAG.

The Schedule referred to in these Letters Patent and making part of the same.

*To all whom it may concern:*

Be it known that we, JACOB S. SPANGLER, DANIEL MADLEM, and HARRISON D. SPANGLER, of Ephrata, in the county of Lancaster, and State of Pennsylvania, have invented a new and useful Improvement on Manure-Drags; and we hereby declare the following to be a clear and exact description thereof, reference being had to the accompanying drawings, making a part of this specification, in which—

Figure 1 is a perspective view of the machine with our improvements in place.

The separate figures show the several parts in detail.

The nature of our invention consists in making this class of implements more durable, and better calculated to bear the strain upon the tines, or united hook, in its bearing, by relieving the central connection from the whole strain, and distributing it to sundry points.

Fig. 1 so clearly shows the construction, that it is only necessary to refer to the parts, to enable any one skilled in the art to make our invention.

B, the central beam.

H, the two handles.

p, the cross-piece through the handles and upright, P.

The lever L, in its socket l, held between two lugs, d, by a pin, or pivot.

D shows the plate and lugs d, catch e, and opening for the forked hook c, on lower side of the socket l.

The band A, across the tines 1, 2, and 3, is fastened on the sides, and constitutes the hook or drag K.

To the band A, on each side, is the continuous brace and holding or draught-rod F attached, forming a loop, f, on the forward end, to slide over the catch e on plate D, when the hook is set for dragging. This loop f is held by said catch, and comes over the notched or forked hook c, on the socket l of the lever L.

The rear of the beam B has a box or bearing, G I, (shown more clearly in the detached figures.)

This box has a central slot, g, for the central tine, the bearings being on each side, for the rounded central portion of the combined hook K.

One bolt will answer for the inner and outer portion of the box G I.

The operation is such that when the manure is grasped and dragged to the place of deposit, it is only necessary to lift the lever L. The forked hook c disengages the loop from the catch e, and the hook will then turn in its bearings, and swing out and dislodge the contents. By simply raising the handles, the hook swings into its vertical position, pushing the loop f of the side-braces F again over the catch, which holds the same in place, when it is again set for grasping and dragging out.

We are aware that patent, No. 63,659, has a central beam and bearing, and is operated by a lever, but the entire strain is on the central projection on top of the hook. We are also aware that patent, No. 66,525, has double bearings or a divided beam, to embrace the upper sides of the hook, besides other arrangements and combinations, respectively claimed; but we are not aware that a single beam is used, having the tines supported with a band, which is connected at the sides by a united brace-rod, forming a loop, combined with a catch and lever-arm, operating in the manner herein shown and described, for the purpose of strengthening and operating the same. Therefore,

What we claim as our invention, and desire to secure by Letters Patent, is—

The arrangement of the brace-band A, in connection with the side-draught braces F, when formed into a loop, f, to connect with a catch, e, and operated by a lever, L, all combined and operating substantially in the manner and for the purpose specified.

J. S. SPANGLER.
DAN'L MADLEM.
H. D. SPANGLER.

Witnesses:
H. B. EBERLY,
WM. K. SELTZER.